(12) United States Patent
Shonting et al.

(10) Patent No.: US 7,120,089 B1
(45) Date of Patent: Oct. 10, 2006

(54) SELF-CONTAINED AMBIENT NOISE RECORDER

(75) Inventors: David H. Shonting, Middletown, RI (US); Peter R. Hebda, Fall River, MA (US); John S. Chaves, North Quincy, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1826 days.

(21) Appl. No.: 08/569,416

(22) Filed: Dec. 6, 1995

(51) Int. Cl.
*H04B 11/00* (2006.01)
(52) U.S. Cl. .................................................... 367/131
(58) Field of Classification Search ................... 367/13, 367/131, 135; 73/170.02, 170.16, 170.29, 73/170.31
See application file for complete search history.

(56) References Cited

U.S. PATENT DOCUMENTS 4,794,575 A * 12/1988 Miller ......................... 367/134
5,504,714 A * 4/1996 Shonting ...................... 367/13

\* cited by examiner

*Primary Examiner*—Dan Pihulic
(74) *Attorney, Agent, or Firm*—James M. Kasischke; Jean-Paul A. Nasser; Michael P. Stanley

(57) ABSTRACT

The present invention relates to an instrumentation apparatus for receiving and recording acoustic signals in a range of depths of approximately 5–100 m beneath the ocean surface and for providing a set of data outputs from which wind velocity and rainfall rate at the surface may be derived. The apparatus includes an omnidirectional hydrophone for substantially isotropical reception of acoustic energy from its upper hemisphere and for producing an output signal representative of the wind velocity and the rainfall rate at the surface. The apparatus further includes a preamplifier connected to the output of the hydrophone and a circuit for processing the amplified signal and recording data derived therefrom. This circuit includes a microprocessor and a data storage device.

10 Claims, 3 Drawing Sheets

SELF-CONTAINED AMBIENT NOISE RECORDER

STATEMENT OF GOVERNMENT INTEREST

The invention described herein may be manufactured and used by or for the Government of the United States of America for governmental purposes without the payment of any royalties thereon or therefor.

CROSS REFERENCE TO RELATED APPLICATIONS

This application is related to allowed U.S. patent application Ser. No. 08/394,106, now U.S. Pat. No. 5,504,714 to an ACOUSTIC AND ENVIRONMENTAL MONITORING SYSTEM by Dr. David H. Shonting filed on 24 Feb. 1995.

BACKGROUND OF THE INVENTION (1) Field of the Invention

The present invention relates to instrumentation apparatus for receiving acoustic signals in a range of depths of approximately 5 to 100 meters beneath the ocean surface and providing a set of data outputs from which wind velocity and rainfall rate at the surface may be derived.

(2) Description of the Prior Art

The traditional torpedo-launching submarine has historically operated relatively independently of sea surface conditions. Although high sea states can cause severe rolling when the keelless submarine attains periscope depth, sea surface conditions interfere less with torpedo launch at deeper depths. With the advent of submarine-launched missiles, environmental parameters, sea state and wind speed have become much more relevant and can adversely impact these newer submarine operations. High sea states are a concern when the submarine requires near-surface launch, because severe rolling can limit or prevent missile deployment, i.e., problems arise which are associated with manipulating, loading and possible launcher jamming of these large weapon systems.

Certain classes of missiles can be vulnerable to the effect of high sea and wind conditions immediately after exiting of launcher tubes as they ascend and exit through the sea surface. The Harpoon missile for example has suffered fatal damage to control surfaces by dynamic pressures associated with the orbital motions of larger waves. The Tomahawk cruise missile can also suffer launch failure as a direct result of inadequate knowledge of wind conditions. This missile, during its in-water, rapid, rocket-driven ascension, is relatively unaffected by wave dynamics, but upon exiting the sea surface, it becomes a light aircraft, whose lift is determined by its relative air speed. An inadvertent downwind launch in a greater than 20 m/s (40-knot) wind speed could mean loss of critical lift and a sudden, unplanned return to the sea. Thus, it is important to establish a viable method for submarines to monitor sea conditions prior to launch operations.

One such technique entails acoustic sensing of sea surface conditions. Wind, wave whitecaps and precipitation are important sources of the ambient sound in the ocean and each of these phenomenon has a unique acoustic signature which can be recorded and used as a basis to develop models to predict sea surface conditions.

Establishing a viable submarine monitoring capability requires a clear understanding of the sound spectrum and intensity levels produced by the various sea surface phenomena. The sources of sound in the ocean are both natural and man-made, displaying large variations in frequency, geographic location, and time. The ambient sound spectrum can be conveniently divided into three bands. In each, the acoustic energy tends to be supplied by a dominant source with overlap at the edges. The low band from 10 to 400 Hz is mostly associated with machinery of shipping or small boat traffic and coastal industry. The mid band from 400 Hz to 40 kHz is contributed principally by oceanographic/meteorological (i.e., geophysical) phenomena at the sea surface. The high band above 40 kHz is mostly low level energy associated with high wave number turbulence and molecular motions. To a lesser extent, in certain local areas, there is a contribution into the mid and high bands by fish noises and cavitation from high speed propellers.

The focus is on the mid range of frequencies for the monitoring of sea surface conditions. The sound spectrum in this mid band (400 Hz to 40 kHz) appears to be produced by the following phenomena:

a) interactions of wind pressure fluctuations at the sea surface;

b) splash impact and bubble formation associated with whitecapping; and c) rain, hail, or snow impacting the sea surface.

Each of the above phenomena are by themselves complex, dynamical processes, largely turbulent in nature. Portraying the associated sound-producing mechanisms requires precise measurements and analysis to sort out the effects.

Studies of geophysical ambient sound have attempted to obtain relationships between the sound and wind speed, whitecapping (i.e., bubble formation) and rain rate. Results, however, are largely empirical and far from quantitative due to the inaccurate data obtained from the hydrophones. The general empirical relation is given as:

$$\log_{10}U, \log_{10}R = a(N_{sl}) + B \quad (1)$$ where

U is the observed wind speed,

R is the observed rainfall rate, $N_{sl}$ is the recorded sound pressure level (in dB) obtained from the hydrophones, and A and B are quasi constants depending on the sound source, range of frequencies and the range of intensities for either U or R.

The value A (a slope) may vary with wind/wave conditions, e.g., at wind speeds below 6–7 m per second, wind pressure fluctuations should be the prime sound source; at higher speeds, multiple contributions occur from whitecap splashing and bubbles, hence increased slope is expected.

In general, the wind and wave sound falls off with frequency at about 6 dB per octave, but the rolloff is not necessarily monatonic because new spectral peaks are seen when whitecaps form. Rain sound falls off with frequency, except for a distinct resonant peak occurring around 15 kHz, owing to a droplet/bubble formation at impact. Wind shows the strongest correlation with sound, showing records from 4.3–14.5 kHz with correlation coefficients of the sound pressure levels with log-wind speed ranged from 0.92–0.96. Rain, on the other hand, generates the highest/loudest signals in its normal ranges attaining up to 60 dB for heavy downpour.

Assessment of the true correlation of the ambient sound with its sources (i.e., wind speed, waves and rainfall) requires precise measurement of the surface phenomena made at the immediate location of the sound observations. A significant obstacle quantifying relationships, such as equation 1, has been the lack of a suitable system for obtaining field measurements relating sound to surface effects with the full range of intensities of wind and wave conditions.

A wide variety of devices have been used to monitor and measure sea conditions such as wave height and wave direction. U.S. Pat. No. 3,336,800 to Appleby, Jr. et al.; U.S. Pat. No. 3,375,715 to Hodges et al.; U.S. Pat. No. 3,765,236 to Erdely; U.S. Pat. No. 3,769,838 to Buckler; U.S. Pat. No. 3,899,668 to Tucker, Jr.; U.S. Pat. No. 3,983,750 to Kirkland; U.S. Pat. No. 4,515,013 to Hue; and U.S. Pat. No. 4,988,885 to Lindstrom illustrate various devices for measuring waves.

The Appleby, Jr. et al. patent discloses a submarine-based acoustic system for measuring wave height and direction. The system employs continuous upward echo ranging to obtain distance measurements from the submarine to the sea surface to provide an indication of wave height and direction. The Hodges et al. patent uses a similar system where acoustic signals are directed toward the sea surface from below the sea surface. The return acoustic signals are used to indicate the slope of the sea surface above the transducers generating the acoustic signals.

The Erdley patent relates to an apparatus for measuring swell frequency and propagation direction of an ocean wave. The apparatus includes a water level indicator which is partially submerged and a ballast. A flexible connection is provided to an anchoring device. The data logger incorporates a magnetic compass and a counter.

The Buckler patent, illustrating yet another device for determining wave height, includes a buoy having an antenna which when oscillating on the wavy sea surface, causes its electronic circuitry to transmit bursts of RF signals, the pulse repetition rate varying directly in proportion to the accelerations of the buoy. Ship-borne apparatus is provided to receive the RF signals and analyze them to determine wave height. The Tucker patent, similar in principle to the Buckley system, relates to a device for electronically analyzing waves.

The Kirkland patent illustrates a water-wave height or fluid level measuring system having a partially submerged support capacitance mast attached to a float on the water surface. A radio frequency transmitter is mounted on the mast and its signals, being analogs of the wave height or other fluid level, are communicated to remote locations.

The Hue patent relates to a buoy having accelerometers and magnetometers for measuring characteristics of an ocean swell.

The Lindstrom patent relates to a submerged small angle field-of-view optical radiometer which passively measures ocean surface wave heights and statistics remotely. The radiometer measures varying underwater radiant light field and correlates that light field to surface wave heights. The device is connected to onshore or inboard electronics. The sensors can be mounted on the sea floor or on a submerged platform such as a submarine.

U.S. Pat. No. 4,172,255 to Barrick et al.; U.S. Pat. No. 4,221,128 to Lawson et al.; and U.S. Pat. No. 4,996,533 to May et al. relate to devices for measuring and/or monitoring surface motions associated with waves. The Barrick device uses radar to remotely sense near surface ocean currents in coastal regions. In operation, the radar detects velocity fluctuations associated with ocean waves. The Lawson patent describes an acoustic current meter in which two channels have acoustic paths oriented at right angles to each other to measure orthogonal components of current velocity associated with wave arbital motions. The May patent relates to a device for mapping ocean currents with a single radar.

Still other devices illustrate systems for measuring environmental conditions such as wind and rainfall. U.S. Pat. No. 4,143,547 to Balser and U.S. Pat. No. 5,125,268 to Caron illustrate such devices. U.S. Pat. No. 3,455,159 to Gies illustrates a nautical weather station which includes an instrumented buoy, a weighted cable attached to each buoy, and one or more submerged pressure cases attached at various depths to the cable. Both the submerged sensor package and buoys are equipped with weather and other environmental sensors. The weather data is FM transmitted from each buoy to remote receiving stations on interrogation.

Still other devices for measuring environmental and oceanographic data are shown in U.S. Pat. No. 4,760,743 to Clifford et al.; U.S. Pat. No. 3,936,895 to Talkington; U.S. Pat. No. 5,303,207 to Brady et al. and U.S. Pat. No. 4,805,160 to Ishii et al.

Field measurements relating sound to surface-generating effects of wind, waves and rainfall has produced chiefly, only empirical relations (such as equation 1) devoid of physics. The lack of accurate field measurements has been due in part to the fact that the sound measurements taken to correlate with surface effects are made at relatively large distances, of often several kilometers, from the bottom-mounted or mid-depth hydrophones. The acoustic signal is thus obtained at a point in the ocean relatively distant from the surface area of generation, which itself is ill defined. Because of this "far-field geometry", individual surface effects are spatially smoothed out, i.e., such measurements fail to spatially resolve noise radiated from small-scale phenomena such as breaking wave crests and turbulent wind gusts and hence produce low or questionable correlations. As a result, little can be inferred about the physical sound-generating mechanism at the surface or the geometry of the generating area.

Another obstacle to obtaining the true correlations has been that most acoustic time series data obtained from near-surface hydrophones have been heavily smoothed over periods of at least one to several hours. As happens with deep hydrophone records, this smoothing can suppress/filter or mask possibly important smaller-scale fluctuations of sound sources associated with wind gusts, breaking waves or passages of wind squalls or rain cells. Moreover, the analysis of the time variability of the ambient sound field associated with the sea surface effects has perhaps been neglected in favor of establishing smooth predictive relationships from averaged data and hence high resolution sampling has been neglected or sacrificed. This results in analyses that have been relatively crude and often lacking in precise spectral characterization of acoustical signatures of the individual sound generators.

Clearly, the correlation of ambient sound with its generating sources is meaningful only to the degree that the true local source producing the sound is identified and simultaneously monitored. The problem of proximity of the sound sources from the hydrophone occurs with wind, and especially, rainfall noise correlations. To wit, due to the difficulty of measuring rainfall at sea, its measurement is often made on land many kilometers from the hydrophones. This can render the correlations at best, biased, and at worst meaningless, since the rainfall is seldom uniform over such separation distances. Rain and sound comparison measurements have been made with hydrophones at 5–35 m depths with rain locally measured, but these were in shallow lakes, thereby placing bottom-mounted hydrophones close to the source of the noise generating mechanisms.

Thus, more appropriate measurements are needed to better understand the physical mechanisms of the generation of ambient sound at the sea surface. A prior art apparatus for doing this is an inexpensive, totally self-contained, stand alone unit, which constitute an easily deployed ambient sound-recording system for taking rapidly sampled near-surface measurements of ambient sound. More particularly, it takes measurements of sound associated with rapidly changing wind and rainfall events measured in close proximity. This is disclosed in a paper by David Shooting and Foster Middleton entitled "Near-Surface Observations of Wind and Rain-Generated Sound Using the SCANR: An Autonomous Acoustic Recorder" in the Journal of Atmospheric and Oceanic Technology, Vol. 5, No. 2, April, 1988.

The totally self-contained, stand alone unit disclosed in the Shooting and Middleton paper is an acoustic monitoring system used by oceanographic personnel of the Department of the Navy, which is hereinafter referred to as the First Generation, Self-Contained Ambient Noise Recorder Unit 10, (or simply "SCANR-I unit 10"), which is shown in FIGS. 1, 2 and 3. FIG. 1 depicts the externally visible components of SCANR-I unit 10, which incorporates a low-noise hydrophone 12 configured for suspension from a surface buoy. The hydrophone 10, enclosed in a neoprene boot, is attached to a stainless steel support bridle 14 and mounted upright with its cable 16 leading to a pressure case 18, which in turn houses recording electronics and a battery pack. The pressure case 18 is connected to the hydrophone cable 16 by a 4-pin, water-tight connector 20.

The hydrophone employed in the SCANR has a free-field voltage sensitivity of −174 db//1 v/uPa over the temperature range of 3–20° C., remaining very flat from 0.1 to 35 kHz. The directivity response in the plane about the hydrophone's longitudinal axis over 15–22 kHz was omnidirectional to within 0.5 dB; hence, its longitudinal axis was mounted vertically to provide horizontal receiving symmetry. The hydrophone and pressure case were capable of withstanding static pressures up to 1700 m depth (70 atm).

The signal processing (including recording) components of SCANR-I unit 10, shown in FIG. 3, depict the output from a hydrophone preamplifier 22 delivered to three bandpass filters 23, 24 and 25, centered at 15, 20, and 25 kHz respectively, with the 20 kHz band convertible to a broad bandpass from 5–40 kHz. The frequencies were chosen because they occur in bands of efficient wind, wave and rain noise generation, as well as being above most ship traffic and coastal industrial noise frequencies.

The output of each filter 23, 24, and 25 was passed through an ac/rms converter chip 26, 27, and 28 with an 800 ms integration time. The voltages were sampled at 1 minute intervals, digitized as 10-bit words (i.e., 1/1024 resolution) and recorded on a Memodyne digital cassette deck 30. The SCANR-I unit 10 was powered by 24 D-cells which sustained the three channels at a 1 minute sampling rate for 7–8 days. Upon retrieval of the unit 10, data from the Memodyne cassette 30 is transferred to a portable computer and stored on disk for subsequent processing and analysis.

A mooring arrangement for suspending a SCANR-I unit 10 at mid-depths on the continental shelf from a moored buoy is depicted in FIG. 2. Unit 10 is suspended from a standard strobe float 32 via a 5–100 m stainless steel cable 34. This permits the contained hydrophone 12 to receive a near-surface acoustic energy isotropically from the upper hemisphere. A 20 m buoyant polypropylene line 36 enables the strobe float 32, a second tethered wave or meteorological buoy 38, and a third float 40 to remain afloat at a desired distance. The buoy 38 shown in FIG. 2 is an Endeco direction wave buoy 956 which provides a complete set of wave height, wave direction and ambient sound data at a single location. However, this buoy 38 can be eliminated if so desired. The strobe float 32 and buoy 38 are maintained in a desired location through the attachment of the third float 40 to a 2 cm diameter nylon 2-1 scope line 42 and a Danforth chain 44. The third float 40 prevents the SCANR-I unit 10 from becoming tangled around the nylon scope line 42 by positioning the line 42 at a distance from the unit 10. All metal shackles connecting the vertical stainless steel tether cable are taped so as to minimize surface noise as the surface float bobs up and down in the wave field. As an alternative to this mooring arrangement, the SCANR-I unit 10 can be suspended from a fixed platform or a free-drifting surface float.

Investigations of correlation between natural surface phenomenon and underwater ambient sound were conducted over the period November 1984 and May 1986 in Narragansett Bay, R.I. during which both wind and rainfall data were obtained. A SCANR-I unit 10 was suspended at 3–4 m depths from the end of 75 m long pier which extended north-westward from a sloping beach on Aquidneck Island. This point of observation had a depth of 12 m and maximum wind fetches of 12–15 km from the northwest and 6–7 km from the southwest. Wind and rainfall were monitored simultaneously with the ambient noise recordings at narrow bands centered at 15 and 25 kHz and a broadband. Wind speed and direction were directly recorded continuously with an R.M. Young Aerovane, while rainfall rate was measured with an AES tipping bucket system on a rooftop tower located 2.2 km south of the observation pier. The wind data was obtained on a strip chart recorder while the rainfall rate was logged on a period processor and digitally recorded on a Compaq computer disk memory.

A correlation of 0.97 of the 15 kHz band with wind-speed was obtained for a 24 hour period with winds ranging from 0.2–15 m/s. At higher sustained winds (12–15 m/s), a pronounced decrease occurred in sound pressure, which decrease appears due to increased absorption of the sound generated at the surfaces by the whitecap-produced bubble layer. Use of direct sound pressure output, in lieu of logarithmic sound levels, best showed the immediate acoustic response to changes of the wind field and rainfall rates associated with passing squalls. On the other hand, the correlation coefficient between the 15 kHz band and rain rate was only 0.068. The rain-noise correlations were rendered imprecise, in part, due to the horizontal separation of the rain gauge from the hydrophone (over 2 km) and, in part, because of the differences in the sampling of the rain gauge (at a point location) vis-a-vis the SCANR hydrophone collecting acoustic energy over a large area. Rain-produced sound attained 35 dB increase within 2–3 minutes during a passing line squall, which was tracked with an MIT weather radar at Cambridge, Mass. some 100 km distance.

The SCANR-I unit 10 system proved useful for observing the near-surface ambient sound field at both broad and narrow bands up to 30 kHz. It is easily deployed and retrieved while nearby observations are made of wind speed, whitecapping intensity and rainfall rate. By means of the foregoing correlation technique, it was found that the prior art SCANR-I had three major drawbacks. First, the filter network of the sound recording system for measurement of ambient sound associated with rapidly changing wind and rainfall events requires improved spectral resolution since certain phenomenon causing the ambient sound may produce more spectral peaks, e.g., rainfall causing 15 kHz maximum peak. This high resolution is needed for a better exploration of the various sound sources in the ocean. Second, the longevity of the battery needs to be improved to allow a longer sampling life. Third, the data memory capacity needs to be increased to accommodate a larger supply of data.

SUMMARY OF THE INVENTION

Accordingly, it is an object of the present invention to provide an improved self-contained ambient noise recorder which addresses the shortfalls of the SCANR-I system.

It is a further object of the invention to provide a self-contained ambient noise recorder which addresses the shortfalls of the SCANR-I system.

It is a still further object of the present invention to provide a self-contained ambient noise recorder as above having improved spectral resolution.

It is yet a further object of the above invention to provide a self-contained ambient noise recorder as above having an improved battery arrangement.

The foregoing objects are attained by the improved self-contained ambient noise recorder of the present invention.

In accordance with the present invention, an apparatus for receiving acoustic signals in a range of depths of approximately 5–100 m beneath the ocean surface and providing a set of data outputs from which wind velocity and rainfall rate at the surface may be derived. It comprises an omnidirectional hydrophone for substantially isotropical reception of acoustic energy from its upper hemisphere and for providing an output signal representative of wind velocity and rainfall rate at the surface. It contains a preamplifier for amplifying the output signal of the omnidirectional hydrophone, and means for processing the preamplified signal connected to the output of the preamplifier. The processing includes a wideband filter connected to the output of the preamplifier means for passing a band of signals in a spectral range not less than approximately 400 Hz and not more than approximately 40 kHz. The processing means further includes first, second and third signal processing channels connected to the output of the wideband filter. The outputs of the three channels are periodically sampled and recorded.

Other details of the apparatus of the present invention, including further objects and advantages, are set forth in the following detailed description and the accompanying drawings wherein like reference numerals depict like elements.

DETAILED DESCRIPTION OF THE PREFERRED EMBODIMENT(S)

Figure 4:
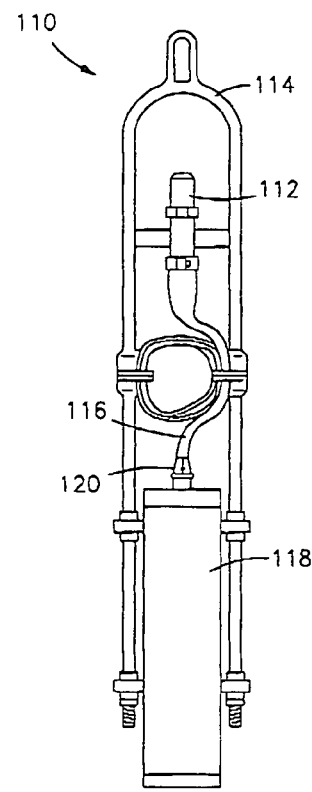
FIG. 4 illustrates a noise recording system in accordance with the present invention.
Figure 3:
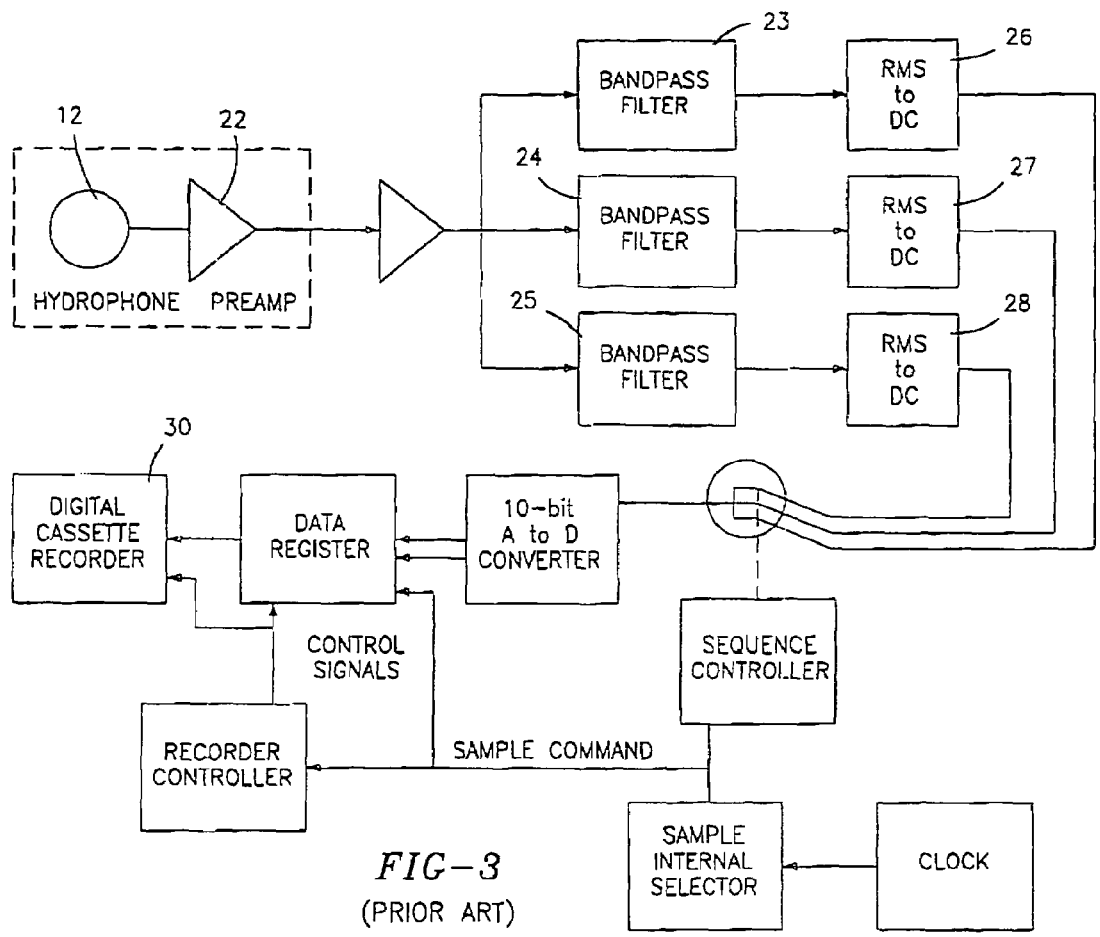
FIG. 3 is a schematic representation of the components of the prior art noise measuring system of FIG. 1.

Referring now to FIG. 4, the improved SCANR instrumentation apparatus 110 in accordance with the present invention has an omnidirectional hydrophone 112 which is supported by a bridle assembly 114 and which is attached to an instrument pressure case 118. The pressure case 118 is connected to the hydrophone cable 116 by a 4-pin, water tight connector 120. It contains the battery pack and the signal processing (including recording) electronics. The SCANR-II unit preferably incorporates an ITC model 6050C hydrophone. The hydrophone, pointing upward, receives acoustic energy approximately isotropically from the upper hemisphere. The hydrophone can be used at depths to 500 m (50 atm), although for most applications, it will be deployed approximately 5 to 100 m beneath the ocean surface. The hydrophone 112 produces output voltage signals which are representative of the wind velocity and rainfall rate at the surface.

Figure 5:
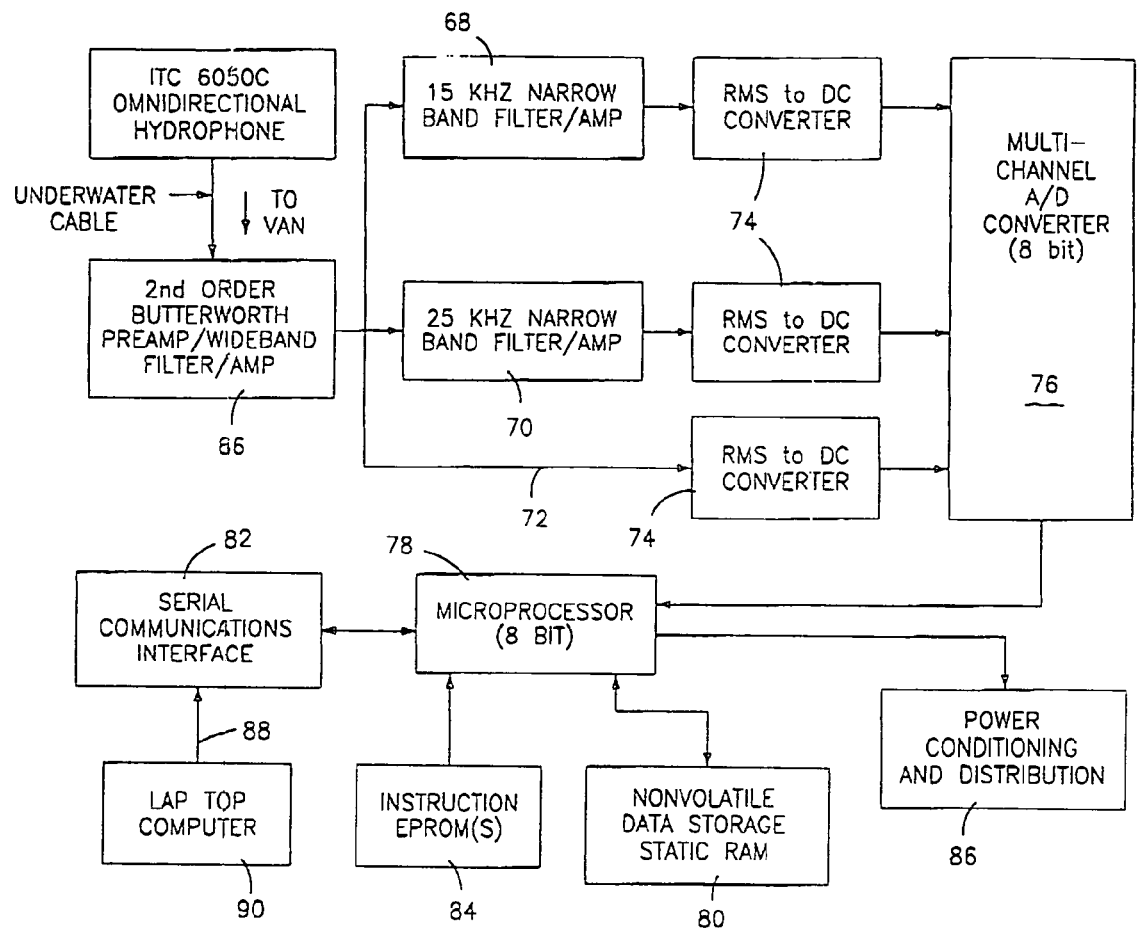
FIG. 5 is a schematic representation of the noise reducing apparatus of the present invention.

The internal electronic components of the SCANR-II processor 124 are shown in FIG. 5. The components are mounted on two standard wire-wrap boards such as the MUPAC board. The SCANR-II processor 124 operates on a 4 MHz clock which is programmed into an EPROM chip 84 in the conventional manner of emulation of a counter. The incoming signal from the hydrophone is preamplified and passed through a 2nd order Butterworth bandpass filter 66. The filter 66 is preferably adopted to pass a band of signals in a spectral range not less than approximately 400 Hz and not more than approximately 40 kHz. The filter 66 preferably has a passband of about 16 Khz between its upper and lower −3 dB cutoff points. For example, the −3 b cutoff points are at approximately 1.0 and 16.0 kHz respectively. The output of the filter 66 is split into three channels with two of the channels running parallel through a first narrow band notch filter 68 and a second narrow band notch filter 70. The notch filter 68 has a center-of-notch-frequency at the lower of two significantly separated predetermined frequencies in the approximate frequency range of 10–40 kHz. The notch filter 70 has a center-of-notch-frequency at the higher of the two significantly separated predetermined frequencies. Preferably, filter 68 has a center-of-notch-frequency of about 15 kHz; while filter 70 has a center-of-notch-frequency of about 25 kHz. The outputs of the narrow band notch filters 68 and 70, along with a third direct unfiltered signal 72 forming the third channel, run into RMS chips 74 where the voltage signals are converted to DC voltage signals and finally into a multi-channel 8-bit A/D converter 76. The output from the converter 76 is fed to a microprocessor 78.

The microprocessor 78 comprises a timing and control central processing unit (CPU) which is preferably based on a Z-80 microprocessor manufactured by the Zilog Company. The microprocessor 78 interfaces with external memory chips forming a nonvolatile data storage static RAM 80, the above described multi-channel A/D converter 76, a serial input/output chip 82, three Erasable Programmable Read Only Memory (EPROM) chips 84 and a battery 86 to make up a microcontroller. All Integrated Circuit Systems (ICS) are Compatible Metal Oxide Semiconductor (CMOS) technology to minimize power consumption.

Figure 6C:
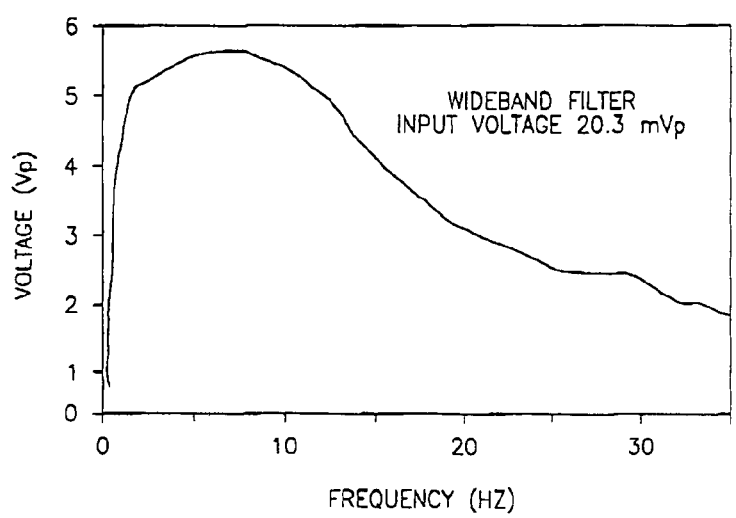
FIGS. 6*a* through 6*c* illustrate frequency vs. voltage outputs for components in the measuring system of FIG. 5.
Figure 6A:
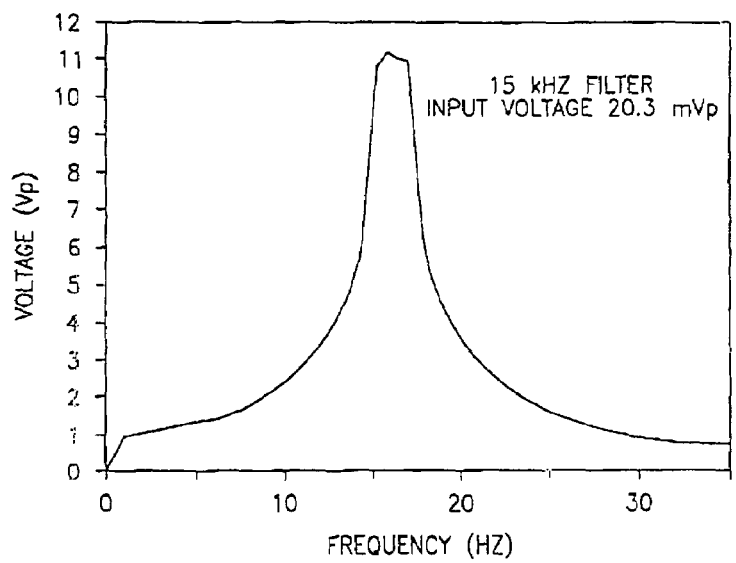
Figure 6B:
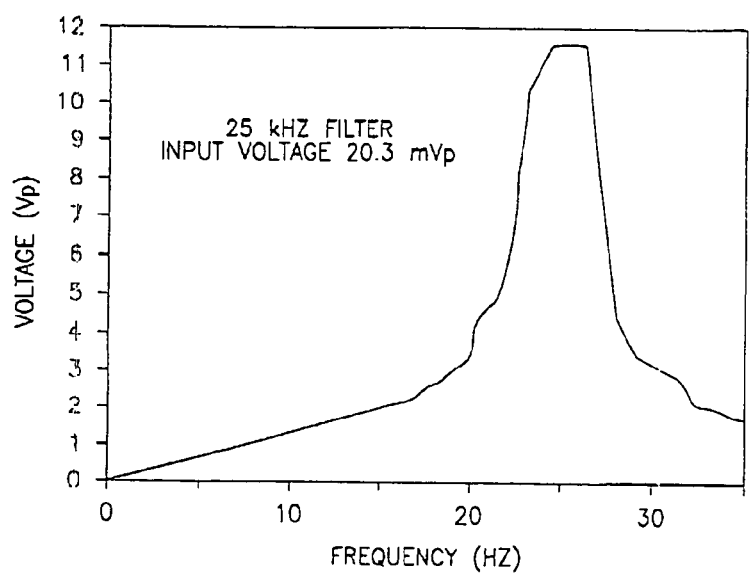

The improved SCANR narrow band filters 68 and 70 and wideband filter 66 are preferably calibrated as follows: a fixed input voltage of 20.3 (peak voltage) sine wave is applied at 2 to 3 kHz increments from 0 to 35 kHz to each of the 15 kHz and 25 kHz narrow band filters 68 and 70 and to the wideband filter 66. This produces the output voltages shown in FIGS. 6*a*–6*c*. The widths of the lower and upper −3 dB points give bandwidths of about 2.5 kHz, about 4.5 kHz and about 16.0 kHz for the 15 kHz, 25 kHz and wideband filters, respectively. The respective gain multipliers which are provided in each of the three effective channels, i.e. (i) input to hydrophone to output of the 15 kHz notch-type narrow band filter channel, (ii) input to hydrophone to output of the 25 kHz notch-type narrow band filter channel, and (iii) input to hydrophone to output of the approximate 1.0 to 16.0 kHz wideband Butterworth filter; are preferably in the approximate ratios 2:2:1, i.e. 490, 488 and 228.

Referring to FIG. 5, the microprocessor 78 receives operational instructions from the three 64 Kb erasable programmable read only memory (EPROM) chips 84. One EPROM is preferably used for data acquisition and two EPROMS are preferably used for terminal communication. Data can be stored on either an 8 K×8-bit (64 K) or a 32 K×8-bit (256 K) Static Random Access Memory (SRAM) 80, which contains a lithium battery to retain data in the memory chip whenever the supply voltage falls below the operational threshold, is turned off, or if the chip is removed from the board.

An auxiliary microprocessor-based system (not shown), which resides in the microprocessor 78, may be used to offload the data, via an RS-232 interface 88, from the memory chip 80 to a laptop PC 90 for subsequent analysis. Data, downloaded in the laboratory ICS, and needed solely for outside communications, are removed to minimize power consumption.

In the event of a system hangup, a hardware reset switch connected to the microprocessor 78 is provided to restart the program. The data RAM 80 is addressed through a series of counters which are incremented by the microprocessor 78 so that if a system reset occurs, the data RAM 80 address does not get reset and no data is overwritten. The data is written in four byte blocks; the first block is an identification number and the remainder are 8-bit values of the 15 kHz, 25 kHz and wideband RMS data. When the highest desired value is reached, the counters are reset to zero and held there so that no further data taking occurs. The counters can be reset only by a toggle switch located on the board.

Power is provided to the entire system by two battery packs which form the battery 86. The first battery pack consists of eleven Ni-Cad 7.2 volt rechargeable individual units configured to provide three independent supplies of +14, −14 and 21.6 volts for use by the analog board which processed the voltage analog signal from the hydrophone. All eleven individual batteries are configured in parallel and can be charged as one group. The second battery pack consists of twenty-eight Ni-Cad 1.2 volt individual units configured to provide 17 volts to a dc-to-dc converter, which in turn provides a steady regulated 5 volt supply to the microprocessor and the supporting electronics. Both battery packs can be charged as a group by use of voltage dividers in line with the charging electrodes.

The procedure for data logging is as follows. The system is turned on and everything is reset. After an elapsed time, determined by the programmed chip, the microprocessor 78 turns on the relays to power the analog board and the hydrophone. A 10 second delay allows the RMS circuits 74 to fully energize and stabilize. The digitized values from the A/D converter 76 are read in by the microprocessor 78 and the relays are turned off. The microprocessor 78 then transfers the data to the data RAM 80, confirms the transfer, then counts down to the next sampling time. The process repeats until the last data RAM address is filled. Circuitry prevents the relays from being turned on once the data RAM 80 has been filled. The sampling time is arbitrarily selected. A one minute interval is preferred for the sampling time since it is capable of capturing the pertinent meteorological events of windspeed, breaking wave occurrence and rainfall rate.

Upon retrieval of the SCANR-II unit, the digital data is extracted by means of the RS-232 serial communications interface 82 connected to the microprocessor 78. An example of the use of the SCANR-II unit is the gathering of acoustic information for comparison to environmental data obtained by above-the-ocean-surface instrumentation to provide empirical tables for estimating windspeed and rainfall rate. Once offloaded, the digitized RMS 74 data is converted to sound pressure levels which can then be plotted and compared to environmental data.

Figure 1:
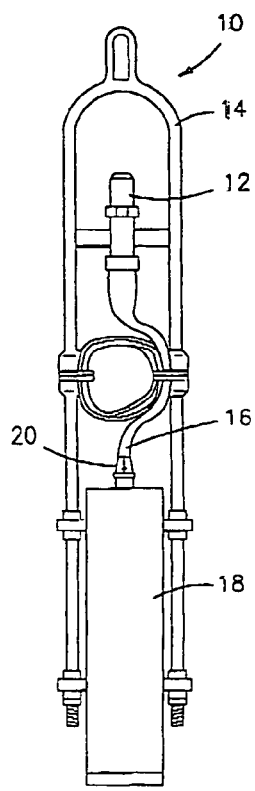
FIG. 1 illustrates a prior art noise measuring system.
Figure 2:
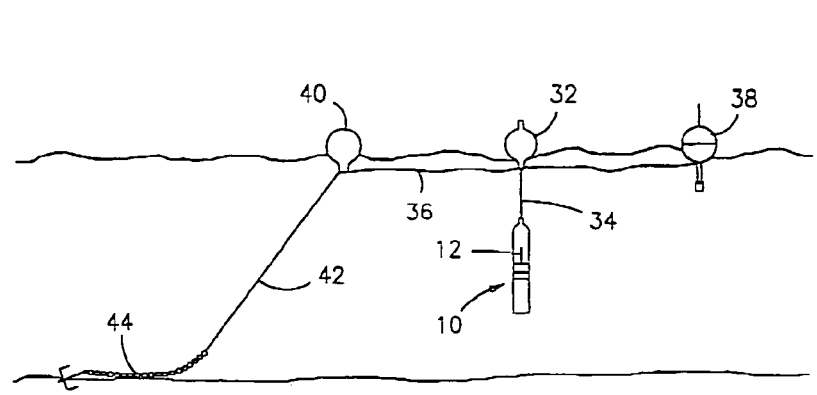
FIG. 2 is a schematic representation of the deployment of the prior art noise measuring system of FIG. 1.

It is to be understood that SCANR-II units, may be deployed in the same manner in which the SCANR-I unit 10 is deployed beneath the surface of the ocean (as shown in FIG. 2 and discussed above). Thus, the SCANR-II unit can be suspended from a moored surface buoy, a fixed platform or a free-drifting surface float.

The improved SCANR unit of the present invention provides better, more efficient signal processing. The novel filter network therein has improved spectral resolution since certain phenomenon causing the ambient sound may produce more spectral peaks, e.g., rainfall causing 15 kHz maximum peak. This high resolution provides a better exploration of the various sound sources in the ocean.

The two battery packs provide a longer recording term. The prior SCANR unit battery lasted from 4–7 days, whereas the improved battery packs allow data to be recorded from 7–14 days.

Still further, the SCANR unit of the present invention has increased data memory capacity. This is achieved through the use of high density memory chips.

The SCANR unit of the present invention may be used in an acoustic and environmental monitoring system such as that shown in co-pending U.S. patent application Ser. No. 08/394,106, filed, Feb. 24, 1995, to an Acoustic and Environmental Monitoring System, By Dr. David H. Shooting, which is hereby incorporated by reference herein.

It is apparent that there has been provided in accordance with this invention an improved self-contained ambient noise recorder which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. Instrumentation apparatus for receiving and recording acoustic signals in a range of depths of from approximately 5–100 m beneath the ocean surface and providing a set of data outputs from which wind velocity and rainfall rate at the surface may be derived comprising:

an ominidirectional hydrophone for substantially isotropical reception of acoustic energy from its upper hemisphere;

said hydrophone producing an output signal representative of the wind velocity and the rainfall rate at the surface;

preamplifier means connected to the output of the omnidirectional hydrophone for amplifying said output signal; and means for processing and recording said amplified output signal, said processing and recording means comprising a wideband filter connected to the output of the preamplifier means for passing a band of signals in a spectral range not less than approximately 400 Hz, and not more than approximately 40 kHz.

2. The instrumentation apparatus of claim 1 wherein said processing and recording means further comprises:
first, second and third signal processing channels connected to the output of said wideband filter;
said first signal processing channel comprising a first notch-type, narrow band pass filter connected to the input of a first RMS-voltage-to-DC-voltage device, said first narrow band pass filter having a center-of-notch-frequency at the lower of two significantly separated predetermined frequencies in the approximate frequency range of about 10 to about 40 kHz;
said second signal processing channel comprising a second notch-type, narrow band pass filter connected to the input of a second RMS-voltage-to-DC-voltage device, said second narrow band pass filter having a center-of-notch-frequency at the higher of said two significantly separated predetermined frequencies; and
said third signal processing channel comprising a third RMS-voltage-to-DC-voltage device directly connected to the output of said wideband filter.

3. The instrumentation apparatus of claim 2 further comprising:
said first notch-type, narrow band pass filter, said second notch-type, narrow band filter and said wideband filter have characteristics such that the amplitude of signal at their respective outputs relative to the signal at the input to the hydrophone are in the approximate ratios 2:2:1.

4. The instrumentation apparatus of claim 2 wherein:
said wideband filter is a second order, Butterworth filter which has a pass band of about 16 kHz between its lower and upper −3 dB points;
said first notch-type, narrow band pas filter has a bandwidth of about 2.5 kHz between its lower and upper −3 dB points; and
said second notch-type narrow band pass filter has a bandwidth of about 4.5 kHz between it lower and upper −3 dB points.

5. The instrumentation apparatus of claim 4, wherein:
the lower −3 dB point and the upper −3 dB point of said second-order Butterworth filter are at approximately 1.0 kHz and 16 kHz, respectively; and
the center-of-the-notch frequency of said first notch-type, narrow band pass filter is approximately 15 kHz, and the center-of-the-notch frequency of said second notch type, narrow pass filter is approximately 25 kHz.

6. The instrumentation apparatus of claim 2 wherein said processing and recording means comprises:
an analog-to-digital converter connected to the outputs of said first, second, and third RMS-voltage-to-DC-voltage devices; and
a central processing unit interfacing with said converter.

7. The instrumentation apparatus of claim 6 further comprising:
means for storing data generated by said RMS-voltage-to-DC-voltage devices interfacing with said central processing unit.

8. The instrumentation apparatus of claim 7 further comprising:
said central processing unit reading digitized values from said converter and transferring said digitized values to said data storing means at predetermined time intervals.

9. The instrumentation apparatus of claim 8 further comprising:
means for offloading data stored in said data storage means, which data can be converted to sound pressure levels.

10. The instrumentation apparatus of claim 6 further comprising:
means for providing power to said hydrophone and to said central processing unit; and
said power providing means comprising a first battery pack for providing power to the hydrophone and a second battery pack for providing power to said central processing unit.

* * * * *